Feb. 20, 1940.                E. A. WESTLING                2,191,164
                              WINDSHIELD CONDUIT
                            Filed June 29, 1938            2 Sheets-Sheet 2
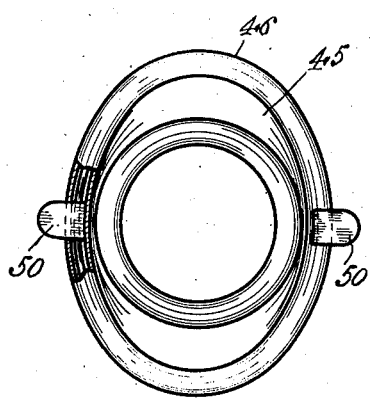
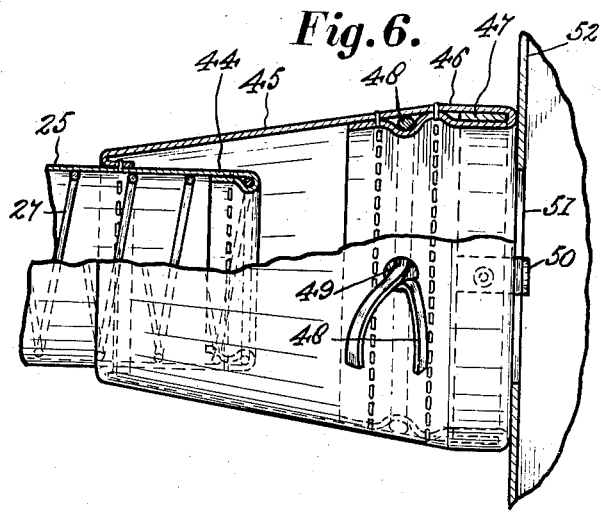
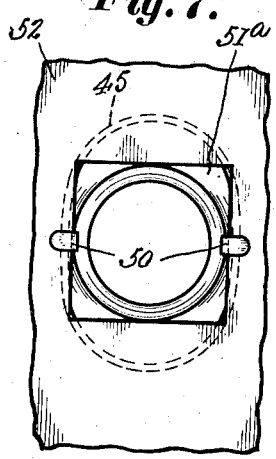
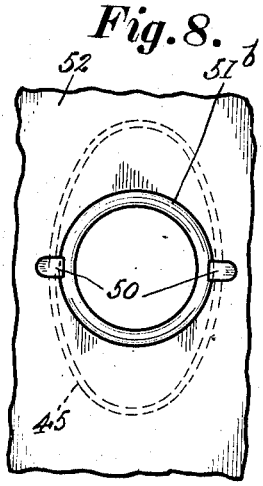
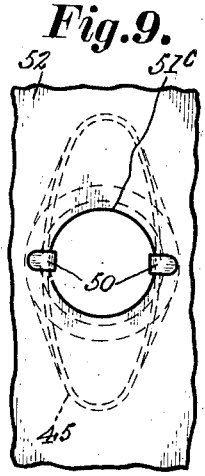
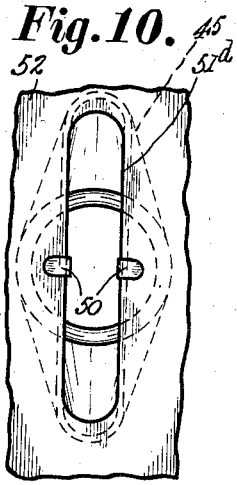
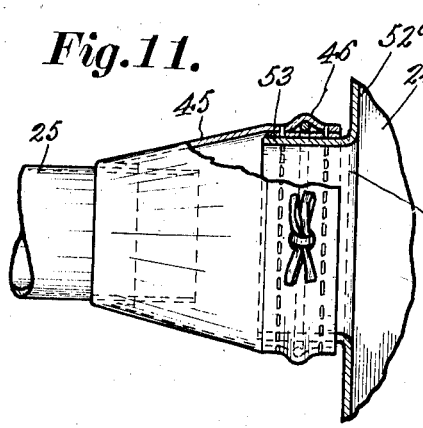
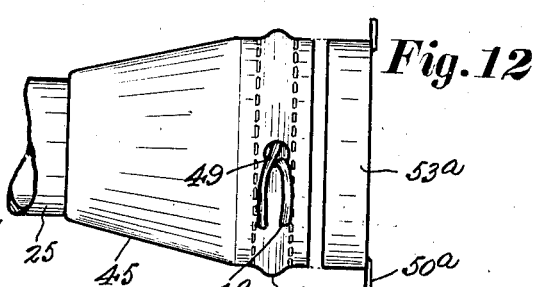
Inventor
E. A. Westling
By Arthur H. Sturges
Attorney Patented Feb. 20, 1940

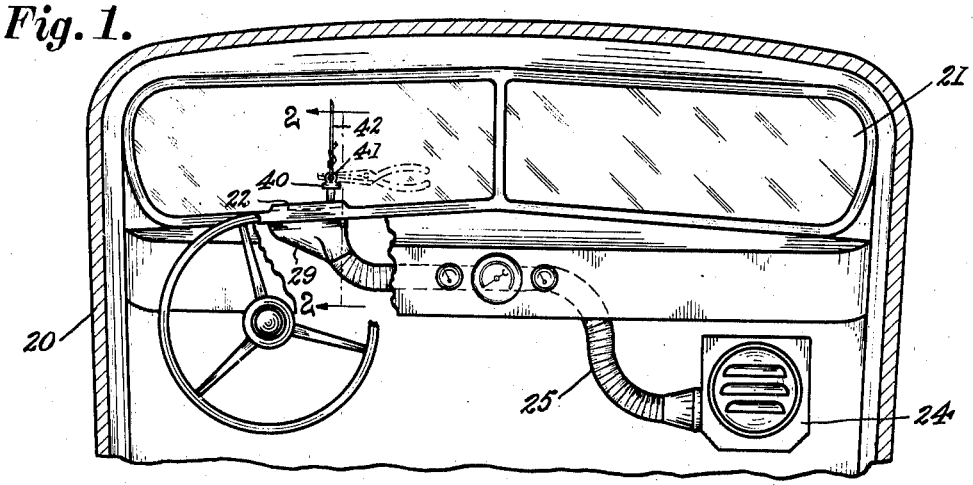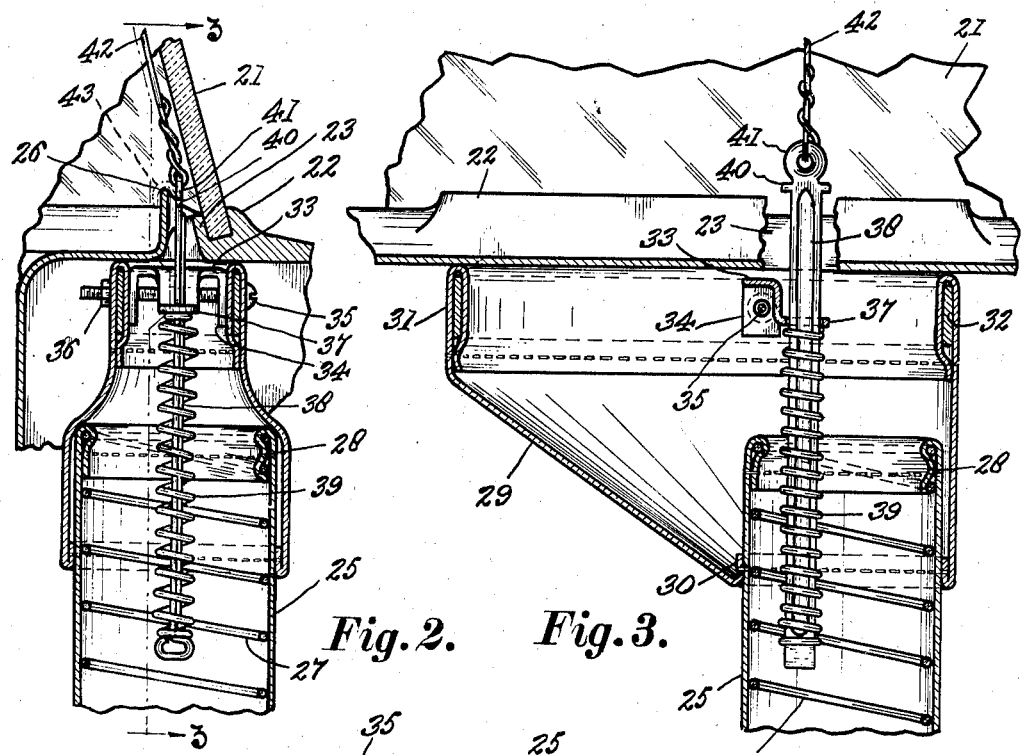

2,191,164

UNITED STATES PATENT OFFICE 2,191,164

WINDSHIELD CONDUIT

Eric A. Westling, Omaha, Nebr., assignor to Jubilee Manufacturing Co., Omaha, Nebr., a corporation of Nebraska Application June 29, 1938, Serial No. 216,600

2 Claims. (Cl. 20—40.5)

This invention relates to automobile windshield heaters, and more particularly to a device for causing hot air to be spread over the surface of the windshield for the purpose of removing frost, sleet and the like therefrom whereby the hazards of motor vehicle operation, particularly during the winter months, are lessened and clear vision provided through the glass of a windshield during said season.

It is an object of the invention to provide a conduit having an end of universal application to all makes of modern automobiles, which at one end may be readily attached to the several different types and sizes of the outlet ports for air provided adjacent the lower edges of the windshield, and which at its other end may be readily attached to the several different types of automobile heaters which employ motors for impelling air through said heaters.

Of late years the manufacturers of several different makes of automobiles provide their own particular make of heater and conduit attachment, the latter extending from the heater to the outlet port adjacent the windshield glass, said conduits being so constructed that they accommodate only a particular make of vehicle, whereby the owner of an automobile heretofore has been forced to purchase a conduit and heater sold by the retailer of the car he owns in order to have a successful installation and at an increased cost to said owner, not only for the certain type of conduit but also for the labor cost of the installation thereof. In other words, it has been the practice of automobile manufacturers to so arrange the outlet port of their particular make of automobile with respect to their heater, that only their particular conduit may be employed for the purpose of controlling the sale of the said automobile accessory and it is a further object of the invention to provide a flexible conduit which may be readily attached to any modern automobile by the owner of the latter and at a reasonable cost as compared with the present practice.

A further object of the invention is to provide a device for the above stated purposes which is economical in construction and efficient in operation.

Other and further objects and advantages of the invention will be apparent from the following detailed description thereof, reference being had to the accompanying drawings in which:

Figure 1 is a front elevation, partly broken away, of the cowlboard of a motor vehicle showing the inside surface of a windshield glass and having an embodiment of the invention attached thereto.

Figure 2 is a detail fragmentary and enlarged sectional view taken substantially on line 2—2 of Figure 1, showing the conduit connected to the base of the windshield.

Figure 3 is a vertical section through the same on line 3—3 of Figure 2.

Figure 4 is a detail top plan view of the mouth of the conduit which engages the base of the windshield in use.

Figure 5 is a plan view of the heater connecting end of said conduit.

Figure 6 is a side elevation of the same, partly in section, engaging the port outlet wall of a heater.

Figure 7 is a fragmentary inner side elevation of the conduit attached to a heater having a rectangular outlet.

Figure 8 is a similar view with a heater having a circular outlet.

Figure 9 is a like view with a heater having a smaller circular outlet.

Figure 10 is a further like view wherein the heater has an elongated or slotted outlet.

Figure 11 is a longitudinal fragmentary section of another form of heater outlet having the conduit attached thereto.

Figure 12 is a side elevation of the conduit separated from a modified form of the attaching ring for connection to the heater.

Referring now to the drawings, and first to Figures 1 to 4, the invention is disclosed as applied to an automobile 20 having a windshield 21 the lower portion of which is mounted in the cowl 22 of the vehicle body, and the latter is provided in the usual manner with a warm air draft opening 23 which opens downwardly through the cowl at the inner side of the windshield and is adapted to receive a current of warm air from a suitable source, such as a heater 24, as shown in Figure 1, suitably connected to the cowl opening 23 by a flexible conduit 25. The cowl opening 23 is provided at its inner side, remote from the windshield 21, with an upstanding flange 26 utilized in the present instance for securing the adjacent end of the conduit in position.

As shown particularly in Figures 2 and 3, the conduit 25 may have a wall of a suitable fabric or the like maintained extended and in flexible condition by a coil spring 27 disposed within the conduit 25 and suitably anchored at opposite ends in the ends of the conduit, such as by the inwardly overturning of the end of the conduit and stitching the same to form a hem 28 within which is anchored the adjacent end of the spring 27.

According to the present invention the conduit 25 is provided at the windshield air supply end, with a hood or mouth section 29 which may also be of fabric. The inner end of the mouth section 29 is secured by a row of stitches 30 to the end portion of the conduit 25, and the mouth section 29 flares outwardly about and from the conduit 25, preferably in one direction or from one side of the conduit away from the heater 24, as shown in Figures 1 and 3 to admit of the use of a shorter conduit and also to accommodate the mouth 29 beneath the section of the windshield 21 arranged over the steering column of the automobile.

The outer enlarged end of the mouth section 29 is overturned to provide a hem 31 within which is secured a flat flexible ring 32, of steel or the like, normally urging the mouth section 29 into distended position, as shown in Figure 4, and to follow the general shape or cross sectional area of the air opening 23. The enlarged end of the mouth section 29 is of sufficiently large dimensions relatively to the opening 23 as to fit against the under flat side of the cowl 22 for substantially sealing the mouth section 29 against the cowl and thus direct heated air upwardly through the opening 23 and thus against the inner side of the windshield 21. The upper end of the mouth section 29 is provided with a cross piece 33 extending between the side walls of the mouth section 29, as shown in Figure 4, and which is provided at opposite ends with flat lugs or ears 34 engaging the inner opposite walls of the mouth section 29, within the ring 32 to hold the latter in spaced relation and from collapsing. The cross piece 33 is held in place by a transverse bolt 35 which is secured through the ears 34 and through the opposite sides of the hem 31 and the ring 32, the bolt 35 having a nut 36 for clamping the several parts upon the bolt.

The cross piece 33 is provided with a slotted tongue 37 disposed intermediate the sides of the mouth section 29 and through which is slidably mounted a connecting bar 38. About the lower end of the bar 38 is disposed a helical spring 39 having its lower end anchored on the bar 38 and bearing at its upper end against the tongue 37 so that the bar 38 is normally urged downward through the tongue by the spring 39. The upper end of the bar 38 may have shoulders 40 projecting therefrom to engage the tongue 37 and hold the bar 38 from accidental displacement from the tongue during handling and installation of the heat conduit. Above the shoulders 40, the bar 38 is provided with an eye 41 for the reception, temporarily, of a pull wire 42 used in mounting the device upon the cowl. The upper end portion of the bar 38 is bendable, as shown in Figure 2, so that the bar may be drawn up through the draft opening 23 and bent over upon the cowl flange 26 to hold the bar 38 under tension and maintain the conduit in place.

In making an installation of the conduit 25 upon the modern type of automobile having the warm air opening 23, the wire 42 is secured through the eye 41 of the attaching or connecting bar 38. The wire 42 is threaded upwardly through the air opening 21 and the mouth section 29 of the conduit is adjusted into proper position beneath and in register with the opening 23 of the column. By means of the wire 42, the bar 38 is now drawn upwardly to compress the spring 39 and lift the mouth section of the conduit 25 up against the underside of the cowl 22 and to also compress and firmly hold the mouth section 29 in contact with the cowl. When the desired pressure is obtained upon the spring 39, the upper end of the bar 38 may be overturned by the use of pliers, as shown in Figure 1, into the hooked position shown in dotted lines at 43 in Figure 2 so that the hook 43 of the bar holds the latter against the tension of the spring, acting through the tongue 37 yieldingly binds the mouth section 29 of the conduit against the bottom of the cowl 22.

With reference now to Figures 5 to 12, showing the opposite or heater end of the conduit attached to heaters for outlet openings of various sizes and configurations, the end of the conduit 25 near the heater is overturned and stitched to provide a hem 44 in which is secured the adjacent end of the helical spring 27 for stiffening the end of the conduit. Stitched, or otherwise secured about the end of the conduit 25 is an attaching hood 45 constructed of fabric or the like and which flares outwardly from and beyond the conduit 25. The hood 45, as shown in Figure 6, is provided with a deep hem 46 having spaced rows of stiches therein to provide an outer pocket for a flexible ring 47, which may be flat as shown and which is capable of being deformed into the various configurations shown in Figures 5 and 7 to 10. The hem 46 has in its other pocket a draw string or tape 48, the ends of which are carried through an opening 49 in the outer side of the hood 45 so that in certain conditions of installation the draw string 48 may be drawn together and tied as shown in Figure 11. The ring 47 is provided at opposite sides with a pair of offset and outwardly turned ears 50 which are adapted, upon compression of the opposite sides of the ring 47, to enter a hot air opening 51 provided in a wall 52 of the heater 24, and which, upon release of the ring 47, are adapted to spring apart and engage over the opposite marginal edges of the opening 51 for holding the hood 45 in tight engagement against the wall 52 and in line with the opening 51.

As shown in Figure 7 the ears 50 engage the opposite sides of a substantially rectangular opening 51a in the wall 52 of the heater and it will be noted that the flaring or enlarged end of the hood 45 is of sufficient size to cover the opening 51a, and it is held distended sufficiently to include all portions of the opening and to also hold the ears 50 in place.

Figure 8 shows a hot air outlet opening 51b of circular form in the wall 52 of the heater. It will be noted that the ears 50 are held over the opposite edges of the opening by the inherent spring action of the ring 47.

Figure 9 shows the same structure of coupling for holding the ears 50 at the opposite sides of an opening 51c of circular form, but of smaller dimensions than that of the opening 51b. From this Figure 9 it will be apparent that the inherent resiliency of the ring 47 adapts the hood 45 and the ears 50 to openings of various sizes as well as shapes.

In Figure 10 the hood 45 is shown as attached to the front wall 52 of the heater and wherein the outlet opening 51d comprises one of the slots or louvre openings in the front of the heater, as shown in Figure 1, and wherein the opening 51d is in the form of a long narrow slot. In this instance the opposite sides of the hood 45 are compressed together sufficiently to interlock the ears 50 with the opposite edges of the opening 51ᵈ and the ring 47 holds the end of the hood 45 into substantially the shape of the opening 51ᵈ. It is thus apparent that the hood 45 is held into substantially the shape of the opening in the heater irrespective of its shape or size.

In Figure 11 a heater 24 is shown provided with a side wall 52ᵃ having a warm air outlet opening 51 therethrough from the marginal portion of which is outturned a coupling neck 53 over which may be placed the end of the hood 45. In this instance the outer portion of the hem 46 is cut from the hood so that the draw string or tape 48 may surround the connecting neck 53, as shown in Figure 11. The draw string 48 is now pulled taut within the remaining portion of the hem 46 to contract the same and bind it upon the neck portion 53 for securing and sealing the hood upon the neck and about the air opening 51.

As a slight modification of the form shown in Figure 11, the coupling neck portion 53ᵃ may be of ring form independent of the structure of the heater 24, the ring 53ᵃ being resilient and supporting a pair of opposed ears 50ᵃ adapted to be snapped through a heater opening and to expand and interlock over the opposite marginal edges of the opening so as to hold the neck portion 53ᵃ to the heater in a manner similar to the attachment of the flexible ring 47 to the heater as shown in Figure 6. When the detachable neck portion 53ᵃ is used, the outer portion of the hem 46 is cut away and the draw string 48 is fitted with its hem portion over the connecting neck 53ᵃ and drawn taut thereabout in a manner similar to that shown in Figure 11.

It is obvious that various changes and modifications may be made in the details of construction and design of the above specifically described embodiment of this invention without departing from the spirit thereof, such changes and modifications being restricted only by the scope of the following claims:

What is claimed is:

1. A conduit for heating automobile windshields comprising a flexible body portion having a flexible mouth section flaring from the end thereof, a resilient ring mounted in the outer end of the mouth section for normally distending the same, a cross piece secured to said ring within the enlarged end of the mouth section, a bar slidably disposed through the cross piece, an expanding spring mounted on the bar with one end connected to the bar and the other end bearing against said cross piece to normally urge the bar inwardly relative to the conduit, said bar adapted to be threaded upwardly through the cowl opening of a windshield and to be drawn up through the opening to compress said spring and yieldingly bind the mouth section against the underside of the cowl, the upper end of said bar adapted to be overturned upon the cowl for holding the bar and the mouth piece under compression.

2. A conduit for heating automobile windshields comprising a flexible body portion having a flexible mouth section flaring from the end thereof, a reinforcing ring mounted in the outer end of the mouth section for holding said mouth open, a cross piece secured to said ring within the enlarged end of the mouth section, a bar slidably disposed through the cross piece, an expanding spring mounted on the bar with one end connected to the bar and the other end bearing against said cross piece to normally urge the bar inwardly relative to the conduit, said bar adapted to be threaded upwardly through the cowl opening of a windshield and to be drawn up through the opening to compress said spring and yieldingly bind the mouth section against the underside of the cowl, the upper end of said bar adapted to be overturned upon the cowl for holding the bar and the mouth piece under compression.

ERIC A. WESTLING.